United States Patent
Tamber

(10) Patent No.: US 8,586,161 B2
(45) Date of Patent: Nov. 19, 2013

(54) BAGS MADE FROM RECLAIMED PLASTIC MATERIAL AND METHODS FOR MAKING SAME

(75) Inventor: Harinder Tamber, Brampton (CA)

(73) Assignee: Macro Engineering & Technology, Inc. (CA)

( * ) Notice: Subject to any disclaimer, the term of this patent is extended or adjusted under 35 U.S.C. 154(b) by 557 days.

(21) Appl. No.: 12/791,757

(22) Filed: Jun. 1, 2010

(65) Prior Publication Data

US 2011/0293206 A1 Dec. 1, 2011

(51) Int. Cl.
*B32B 1/02* (2006.01)

(52) U.S. Cl.
USPC ............................. 428/36.4; 428/35.2

(58) Field of Classification Search
USPC .......... 428/34.1–35.5, 35.7–35.9, 36.4–36.91
See application file for complete search history.

(56) References Cited

U.S. PATENT DOCUMENTS 6,214,440 B1 * 4/2001 Peiffer et al. ................ 428/141
2009/0263600 A1 * 10/2009 Miyashita et al. ........... 428/35.2

* cited by examiner

*Primary Examiner* — Walter B Aughenbaugh
(74) *Attorney, Agent, or Firm* — Steven M. Greenberg, Esq.; Carey Rodriguez Greenberg O'Keefe, LLP

(57) ABSTRACT

Bags are formed from reclaimed plastic material. Each bag comprises two opposed sheet sections formed substantially entirely of a first polymer class, but also containing impurity particles of a different polymer class. The sheet sections comprise at least two distinct independent layers, with each layer in each sheet section being surface bonded to each adjacent layer in that sheet section. Although discontinuities in each layer resulting from the impurity particles create weak areas and in some cases apertures, the weakened portions of each layer are reinforced by portions of the other layer that are not weakened, since there is a minute likelihood that an impurity particle in one layer will be precisely co-located with an impurity particle in an adjacent layer. Thus, each layer reinforces the other layer to maintain structural integrity of the sheet section and of the bag. Methods for forming such bags are also described.

1 Claim, 4 Drawing Sheets

BAGS MADE FROM RECLAIMED PLASTIC MATERIAL AND METHODS FOR MAKING SAME

FIELD OF INVENTION

The present invention relates to plastic bags, and more particularly to plastic bags made from reclaimed plastic material.

BACKGROUND OF THE INVENTION

It is desirable to use reclaimed plastic material in the production of various products, because such recycling has an environmental benefit and may also result in cost reductions where the reclaimed plastic material is less costly than the corresponding virgin material.

Unfortunately, reclaimed plastic material often contains contaminants and impurities that impair its utility for certain products, forcing the producers of those products to either reduce the quantity of reclaimed plastic material used in favor of virgin material, or forego the use of reclaimed plastic material entirely. For example, while plastic bags, such as garbage bags, can be made from plastic sheets formed from reclaimed plastic material, in practice reclaimed plastic material frequently contains impurities in the form of particles of other types of plastic. These particulate impurities will not be mixed into the melted plastic material used to form the bags, but would remain as separate particles embedded in the plastic sheets, which can result in discontinuities leading to openings and leakage, and even tearing, upon stressing of such bags by placing material in them and carrying them.

Such difficulties can be addressed by taking appropriate steps to ensure the purity of the reclaimed plastic material used, but this approach increases the costs associated with recycling.

SUMMARY OF THE INVENTION

Bags can be formed from reclaimed plastic material containing impurities, using a structure that mitigates the effect of the impurities on the strength of the bags.

In one aspect, the present invention is directed to a bag formed at least in part from reclaimed plastic material. The bag comprises two opposed sheet sections formed substantially entirely of a plastic of a first plastic type. The sheet sections are sealed to one another along at least one edge thereof to define an enclosure between the sheet sections and having an opening into the enclosure defined by unsealed edge portions of the sheet sections. Each sheet section comprises at least two distinct independent layers formed substantially entirely of the plastic of the first plastic type, with each layer in each sheet section being surface bonded to each adjacent layer in that sheet section. Each layer contains impurity particles comprising plastic of a type other than the first plastic type. These impurity particles are unmixed with the plastic of the first plastic type, and the impurity particles may comprise up to 10 percent by weight of the plastic forming each opposed sheet section.

In a preferred embodiment, the first plastic type is a plastic type selected from the group consisting of polyethylene, polypropylene, polylactic acid, and polyhydroxyalkanoates, and in a particularly preferred embodiment, the first plastic type is polyethylene, in which case the impurity particles may comprise at least one material selected from the group consisting of polyvinylchloride, polystyrene and polypropylene.

In one embodiment, each sheet section comprises two distinct layers. In such an embodiment, each sheet section may preferably have a thickness between 5 and 20 microns, and each layer may preferably have a thickness between 2.5 and 10 microns. More preferably, each sheet section has a thickness between 6 and 10 microns and each layer has a thickness between 3 and 5 microns.

In an embodiment, the layers in each sheet section are separable from one another, and in one particular embodiment each layer in each sheet section is surface bonded to each adjacent layer in that sheet section by blocking. In another embodiment, each layer in each sheet section is surface bonded to each adjacent layer in that sheet section by adhesive.

The two opposed sheet sections may comprise portions of a larger sheet folded over onto itself.

In another aspect, the present invention is directed to a method for forming bags at least in part from reclaimed plastic material. The method comprises melting reclaimed plastic material substantially entirely comprising plastic of a first plastic type and also containing impurities comprising plastic of a type different than the first plastic type. The impurities may comprise up to ten percent by weight of the plastic material. The method further comprises forming the melted reclaimed plastic material into at least one sheet comprising at least two distinct independent layers surface bonded together, and forming bags from the at least one sheet, with each bag comprising two opposed sheet sections.

In a preferred embodiment, the first plastic type is a plastic type selected from the group consisting of polyethylene, polypropylene, polylactic acid and polyhydroxyalkanoates, and in a particularly preferred embodiment, the first plastic type is polyethylene, in which case the method may further comprise adding an additive to the polyethylene so that the polyethylene becomes biodegradable.

The step of forming the melted reclaimed plastic material into at least one sheet comprising at least two distinct independent layers preferably comprises forming the melted reclaimed plastic material into at least one sheet comprising two distinct independent layers.

Also preferably, the step of forming the melted reclaimed plastic material into sheets comprises extruding the melted reclaimed plastic material from an annular die as a tubular film, forming the extruded film into a bubble with air entrapped therein by collapsing the tubular film bubble at a predetermined distance from the annular die, and surface bonding opposite sides of the collapsed film to one another so that each side of the collapsed film forms one of the layers in a respective sheet. The opposite sides of the collapsed film may be bonded to one another by blocking, or the method may further comprise adding adhesive to the reclaimed plastic material after melting the reclaimed plastic material and before forming the melted reclaimed plastic material into at least one sheet, so that the opposite sides of the collapsed film are bonded to one another by the adhesive.

BRIEF DESCRIPTION OF THE DRAWINGS

These and other features of the invention will become more apparent from the following description in which reference is made to the appended drawings wherein.

DETAILED DESCRIPTION

Figure 1:
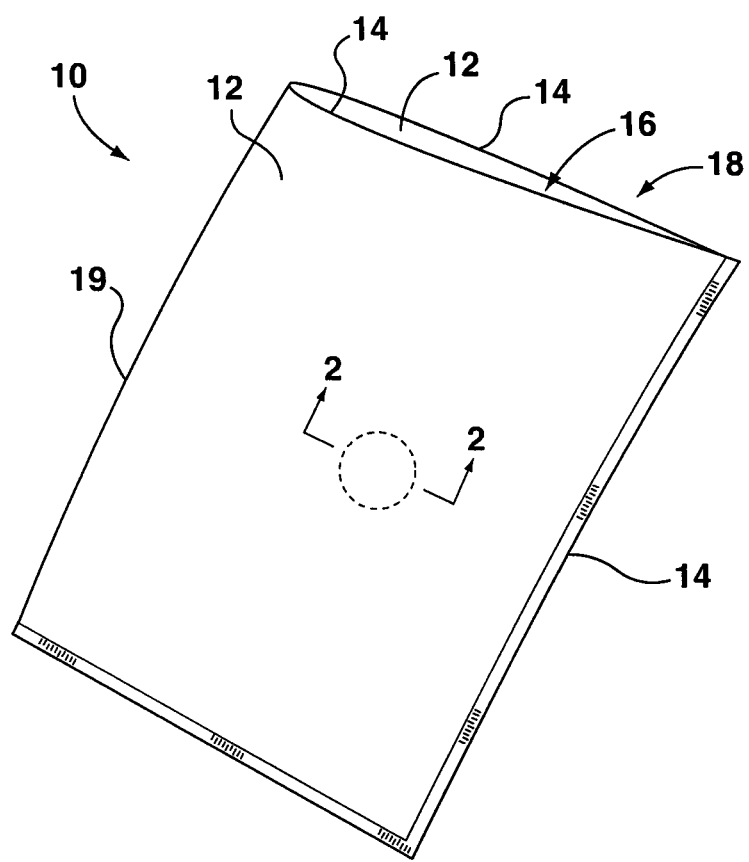
FIG. 1 is a perspective view of an exemplary reclaimed plastic bag formed from two opposed sheet sections, according to an aspect of the present invention.

Reference is now made to FIG. 1, where an exemplary plastic bag according to an aspect of the present invention is shown generally at 10. In the exemplary embodiment, the bag 10 is formed at least in part from reclaimed plastic material, such as post-consumer recycled material. The bag 10 comprises two opposed sheet sections 12 each formed substantially entirely of plastic of a first plastic type. As used herein, the term "substantially entirely" refers to the fact that the plastic of a first plastic type is not pure as would be the case if the bag were made entirely from virgin plastic of the first plastic type, but instead the plastic contains impurity particles resulting from the reclamation process. The impurity particles comprise plastic of a type other than the first plastic type from which each sheet section 12 is formed, and may comprise up to 10% by weight of the total weight of the plastic material of each sheet section 12.

The sheet sections 12 are sealed to one another along at least one edge 14 thereof to define an enclosure 16 between the sheet sections 12. An opening 18 into the enclosure 16 is defined by corresponding unsealed edge portions 14 of the sheet sections 12. In the illustrated embodiment, the sheet sections 12, and hence the bag 10, are rectangular, and the two opposed sheet sections 12 comprise portions of a larger unitary sheet of plastic that has been folded over onto itself, with two adjacent edges 14 being sealed and the fold 19 defining a third edge. The opening 18 is defined by the fourth edges 14 which are unsealed. Alternatively, a bag may be formed by placing two separate rectangular sheet sections in ovelying relation and sealing three adjacent pairs of side edges of the sheet sections to one another while leaving a single pair of side edges unsealed to define the opening. In other embodiments, the sheet sections and the bags formed therefrom may have other shapes besides rectangular, and may for example have curved edges. Such alternate embodiments of bag construction are expressly contemplated as being within the scope of the invention.

Figure 2:
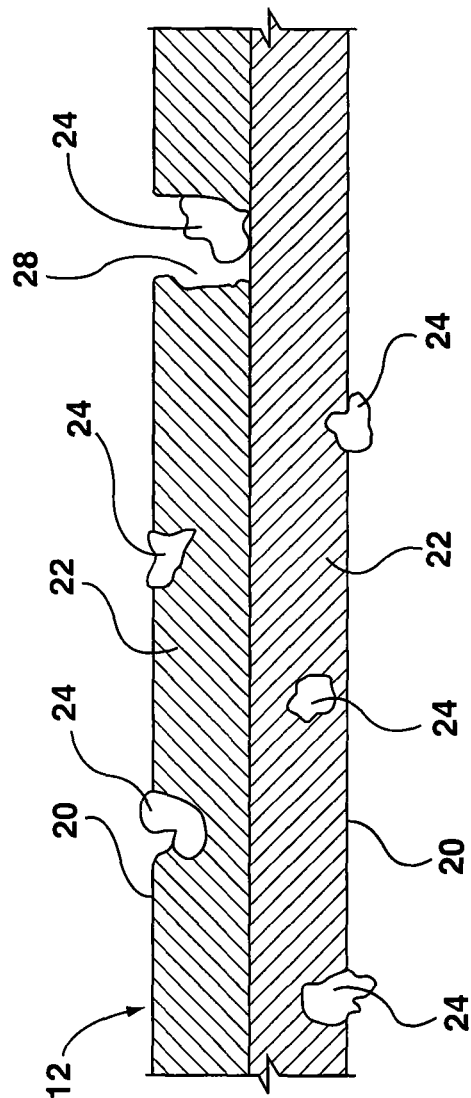
FIG. 2 is a detailed cross-sectional view of an exemplary embodiment of one of the sheet sections of the bag of FIG. 1, taken along the line 2-2 in FIG. 1.

Referring now to FIG. 2, it can be seen in cross-section that each sheet section 12 comprises two distinct independent layers 20, with each layer 20 formed substantially entirely of plastic 22 of a first plastic type. The layers 20 may be made from any suitable type of reclaimed plastic material, including polyethylene, polypropylene, polylactic acid, and polyhydroxyalkanoates, and polyethylene is preferred. The adjacent layers 20 are surface bonded to one another, and the plastic 22 in each layer 20 contains impurity particles 24. As noted above, the impurity particles 24 comprise plastic of a type other than the first plastic type from which each sheet section 12, and more particularly each layer 20 of each sheet section 12, is formed. Because the impurity particles 24 are of a plastic type different from the first plastic type, the impurity particles 24 are not mixed (unmixed) with the plastic 22 forming the layer 20 and hence result in discontinuities in the plastic 22 forming the layer 20.

For example, where the first plastic type is polyethylene, the impurity particles 24 may be particles of polyvinylchloride, polystyrene and/or polypropylene, since these latter three types of plastic will not mix with polyethylene. In contrast, the various sub-types of polyethylene, such as very low density polyethylene, linear low density polyethylene, medium density polyethylene and high density polyethylene, are all part of the polyethylene class and hence are all of the same plastic type and would not be considered impurities.

Where the first plastic type is polypropylene, the impurity particles 24 may be particles of polyvinylchloride, polystyrene and/or polyethylene, which do not mix with polypropylene, whereas the sub-types of polypropylene, including homopolymer, copolymer and terpolymer polypropylene, are not considered impurities since they are all types of polypropylene.

Where the first plastic type is polylactic acid or polyhydroxyalkanoates, the impurity particles 24 may be comprise any one or more of polyethylene, polyvinylchloride, polystyrene and/or polypropylene, each of which will not mix with polylactic acid or polyhydroxyalkanoates.

Within each layer 20, the discontinuities resulting from the impurity particles 24 create areas of weakness, and in some cases apertures 28, in the layer 20, which could result in leaks and rips in that particular layer 20. However, because the layers 20 are surface bonded to one another, and because of the minute likelihood of an impurity particle 24 in one layer 20 being precisely co-located with an impurity particle 24 in an adjacent layer 20, the portions of each layer 20 that are weakened by the impurity particles 24 are reinforced by portions of the other layer 20 that are not so weakened. More particularly, an area of one layer 20 that contains an impurity particle 24 and is therefore weakened will generally be surface bonded to a stronger area of the adjacent layer 20 that does not contain any impurity particles 24. Thus, each layer 20 reinforces the other layer 20 to maintain structural integrity of the sheet section 12 as a whole. The unmixed impurity particles 24 may comprise up to 10% by weight of the total weight of the plastic material of each layer 20.

Preferably, as shown in FIG. 2, the layers 20 in each sheet section 12 are surface bonded to each adjacent layer 20 in that sheet section 12 so that the layers 20 are separable from one another. Preferably, the layers 20 may be surface bonded to one another by blocking as shown in FIG. 2. Alternatively, to facilitate surface bonding one or more adhesives may be blended into the melted plastic used to form the bags 10, as described in more detail below.

In a preferred embodiment, each sheet section 12 has a thickness between 5 and 20 microns, and each layer 20 has a thickness between 2.5 and 10 microns. In a still more preferred embodiment, each sheet section 12 has a thickness of between 6 and 10 microns and each layer 20 has a thickness between 3 and 5 microns.

FIG. 2 shows, by way of non-limiting illustration, an exemplary sheet section 12 having two layers 20.

The bags made according to aspects of the present invention are particularly suitable for use as refuse bags, such as for kitchen and other household waste. Optionally, a suitable additive can be mixed with the reclaimed plastic so that the sheet sections 12, and hence the bag 10, will be biodegradable, or the reclaimed plastic material may be biodegradable. Suitable additives for making polyethylene biodegradable are known to those skilled in the art, and therefore are not described further.

Figure 3:
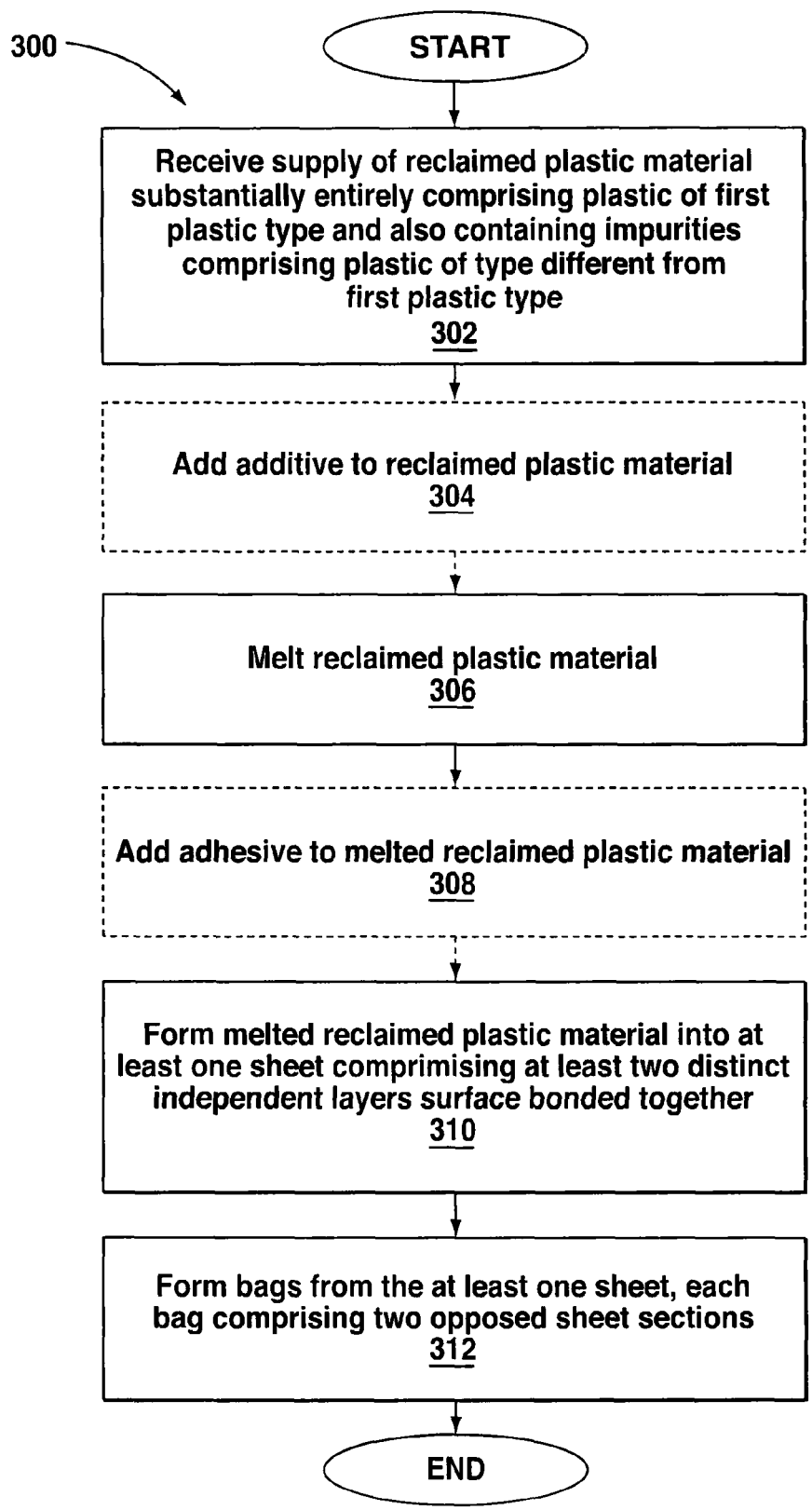
FIG. 3 is a flow chart showing a method for forming bags from reclaimed plastic material.

Reference is now made to FIG. 3, in which a method 300 for forming bags from reclaimed plastic material is illustrated in flow chart form. At step 302, a supply of reclaimed plastic material is received, typically in the form of pellets. The reclaimed plastic material received at step 302 substantially entirely comprises a plastic material of a first plastic type, and also contains impurities in the form of one or more other, different plastic types. The impurities may comprise up to 10 percent by weight of the total weight of the plastic material. At optional step 304, a suitable additive is added to the reclaimed plastic material so that it will be biodegradable, as described above. At step 306, the reclaimed plastic material is melted and mixed. Although steps 304 and 306 are shown as being sequential, these steps may in fact be performed substantially simultaneously. For example, the additive may be added to the reclaimed plastic material as it is being melted and mixed. At optional step 308, adhesive is added to the melted plastic material.

At step 310, the melted reclaimed plastic material is formed into at least one sheet, with each sheet comprising at least two distinct independent layers. At step 312, bags are formed from the at least one sheet, with each bag comprising two opposed sheet sections. For example, the sheets may be cut into smaller sheet sections, with bags being formed by placing two sheet sections in overlying relation and sealing edges of the sheet sections, or a larger sheet section may be folded onto itself to define two smaller sheet sections whose edges are then sealed. Methods and apparatus for forming bags from plastic sheet material are well-known in the art, and are not described further here.

Figure 4:
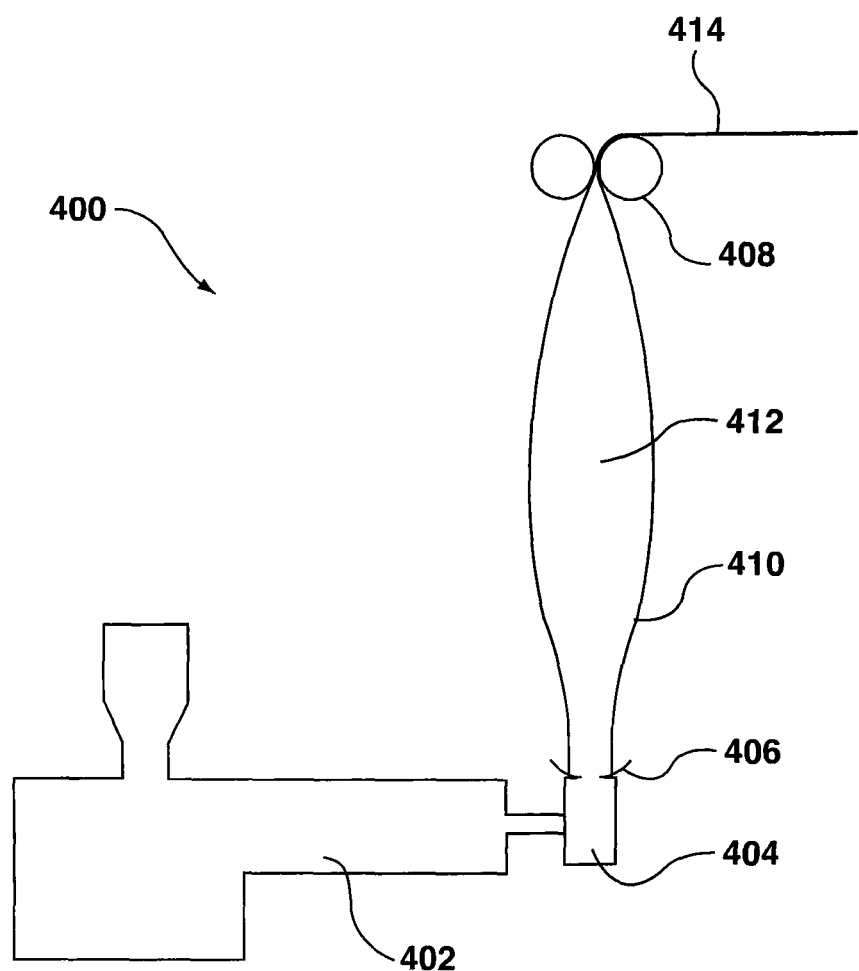
FIG. 4 is a schematic representation of an apparatus that may be used in the practice of the present invention.

FIG. 4 illustrates schematically apparatus 400 for forming the melted reclaimed plastic material into sheets as per step 308 of the method 300. The apparatus 400 is adapted from the teachings of U.S. Pat. No. 6,162,318 issued on Dec. 19, 2000 and for which the present inventor is a co-inventor. U.S. Pat. No. 6,162,318, and U.S. Pat. No. 6,413,346, which is a continuation-in-part thereof, are hereby incorporated by reference in their entirety.

The apparatus 400 comprises an extruder 402, an annular die 404, an air ring 406 and a pair of pinch rollers 408 spaced a predetermined distance from the annular die 404. The melted reclaimed plastic material is extruded from the annular die 404 as a tubular film 410, and forms a bubble 412 with air entrapped therein. The tubular film 410, and hence the bubble 412, is collapsed by the pinch rollers 408. The pinch rollers 408 form the tubular film 410 into a sheet 414 by pressing the opposed sides of the collapsed tubular film 410 against each other and thereby surface bonding the opposite sides of the collapsed film 410 to one another. Thus, each side of the collapsed film 410 forms one of the layers in the sheet 414. The sheet 414 can then be used to form bags as described above. In one embodiment, the sheet 414 may be carried by additional rollers (not shown) directly to bag-making apparatus (not shown). In another embodiment, the sheet 414 may be wound onto a roller (not shown) and transported to another location within the same facility, or to a different facility, to be formed into bags.

In one embodiment of the method 300, the opposite sides of the collapsed film 410 are surface bonded to one another by blocking. In such an embodiment, the distance between the pinch rollers 408 and the annular die 404 is selected so that the tubular film 410 will have cooled sufficiently by the time it reaches the pinch rollers 408 that the opposed sides will adhere to each other by blocking. In another embodiment of the method 300, the opposite sides of the collapsed film 410 are surface bonded to one another by adhesive. In such an embodiment, adhesive is added to the melted reclaimed plastic material at step 308. For example, liquid adhesive may be added through a bore in the extruder screw, as is known in the art. The type and quantity of adhesive, and the distance between the pinch rollers 408 and the annular die 404, should be such that the opposite sides of the film 410 possess adhesive properties when they reach the pinch rollers 408, but that the collapsed film is no longer adhesive at the time the collapsed film 410 is formed into bags.

Bags made according to aspects of the present invention may contain anywhere from 0.5% to 100% reclaimed plastic material, with the balance of material, if any, being made up of virgin plastic material of the same plastic type.

One or more currently preferred embodiments have been described by way of example. It will be apparent to persons skilled in the art that a number of variations and modifications can be made without departing from the scope of the invention as defined in the claims.

What is claimed is:

1. A bag formed at least in part from reclaimed plastic material, comprising:
    two opposed sheet sections formed substantially entirely of a plastic of a first polymer class, the sheet sections sealed to one another along at least one edge thereof to define an enclosure between the sheet sections and having an opening defined by unsealed edge portions of the sheet sections;
    each sheet section comprising at least two distinct independent layers formed substantially entirely of the plastic of the first polymer class;
    each layer in each sheet section being surface bonded to each adjacent layer in that sheet section;
    each layer containing impurity particles comprising plastic of a second polymer class different from the first polymer class, the impurity particles unmixed with the plastic of the first polymer class, the plastic forming each sheet section comprising up to 10 percent by weight of the impurity particles;
    wherein the layers in each sheet section are separable from one another; and
    wherein each layer in each sheet section is surface bonded to each adjacent layer in that sheet section by blocking.

\* \* \* \* \*